Figure 1:
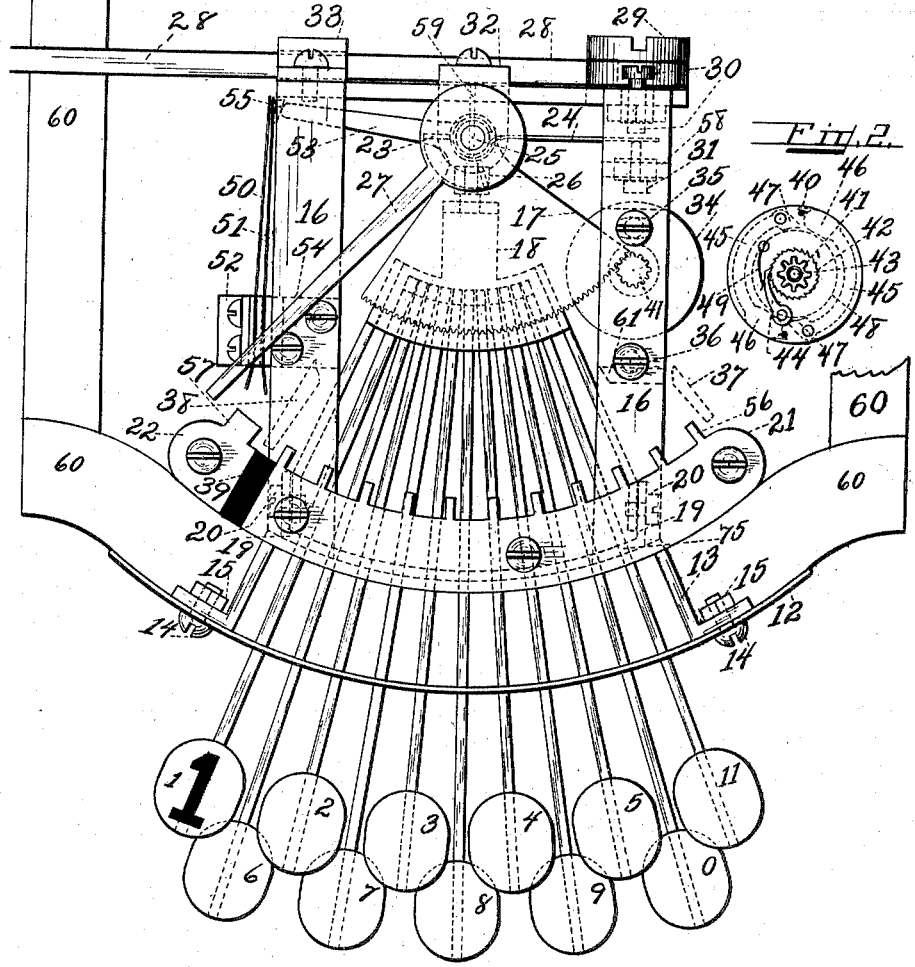

No. 816,948. PATENTED APR. 3, 1906.
A. E. STEVENS.
CONTROLLER FOR AUTOMATIC TELEPHONE SYSTEMS.
APPLICATION FILED JULY 12, 1905.

3 SHEETS—SHEET 1.

No. 816,948. PATENTED APR. 3, 1906.
A. E. STEVENS.
CONTROLLER FOR AUTOMATIC TELEPHONE SYSTEMS.
APPLICATION FILED JULY 12, 1905.
3 SHEETS—SHEET 2.
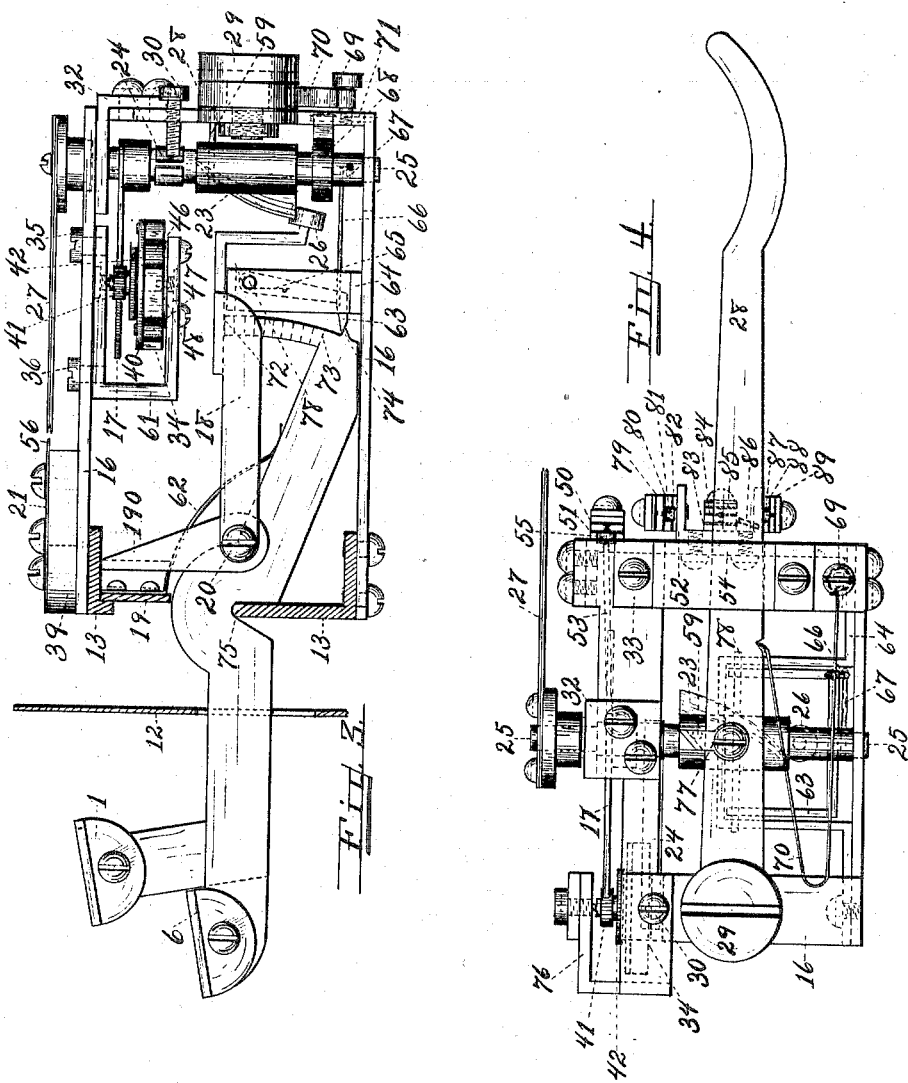
WITNESSES:
F.J.V. Dakin
E.F. Isaac.
INVENTOR
Alton E. Stevens
BY Charles F. Richardson
his ATTORNEY No. 816,948. PATENTED APR. 3, 1906.
A. E. STEVENS.
CONTROLLER FOR AUTOMATIC TELEPHONE SYSTEMS.
APPLICATION FILED JULY 12, 1905.

3 SHEETS—SHEET 3.

WITNESSES:

INVENTOR

BY

ATTORNEY

UNITED STATES PATENT OFFICE.

ALTON E. STEVENS, OF FALL RIVER, MASSACHUSETTS.

CONTROLLER FOR AUTOMATIC TELEPHONE SYSTEMS.

No. 816,948.

Specification of Letters Patent.

Patented April 3, 1906.

Application filed July 12, 1905. Serial No. 269,429.

*To all whom it may concern:*

Be it known that I, ALTON E. STEVENS, a citizen of the United States, residing at Fall River, in the county of Bristol and State of Massachusetts, have invented a certain new and useful Controller for Automatic Telephone Systems, of which the following is a specification.

In automatic telephone systems each station or telephone is provided with a mechanical device for controlling the central-exchange apparatus, and when such device is used it causes the said apparatus to move and select the line desired by the operating party.

In certain automatic telephone systems it is necessary to have a controller which will upon removal of receiver from its hook bring one line-wire into momentary connection with ground, which upon operating a numbered member in the manner provided will automatically cause one line-wire to be brought into momentary connection with ground a number of times in succession, the number of contacts corresponding with the number of the member operated, and after each series of connections will cause a final momentary connection between the other line-wire and ground and which will upon replacing receiver on its hook cause both wires to be pressed together and brought into momentary connection with ground.

The objects of my invention are, first, to use keys or push-buttons in place of the usual dial or indicator, said keys or push-buttons being more convenient to operate; second, to provide a controller in which all the keys or push-buttons have a uniform movement; third, to provide a controller with parts easily detached for repair or replacing; fourth, to provide a controller in which the largest possible size of number can be used on the numbered members, thus reducing liability to mistake in operating.
I accomplish my objects by mechanism illustrated in the drawings.

Figure 5:
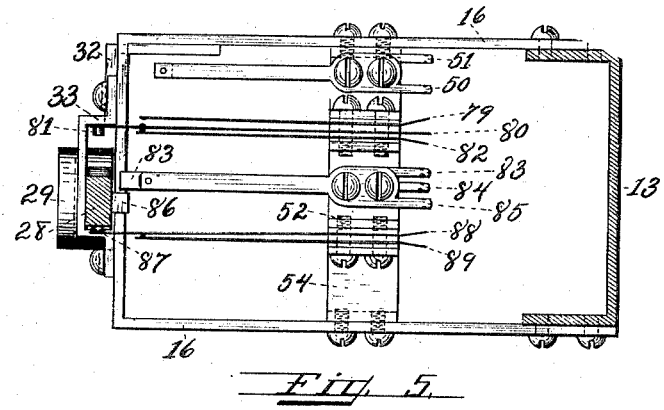
Figure 6:
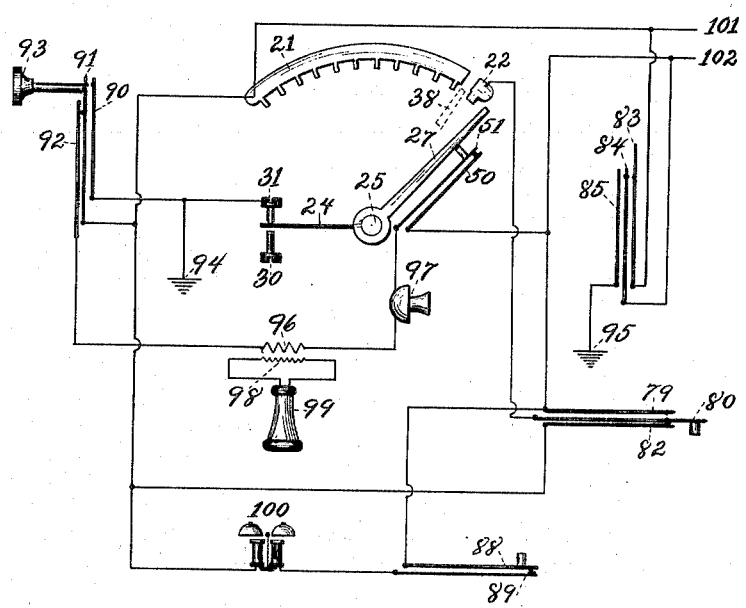

Figure 1 represents a plan of controller. Fig. 2 represents a plan of a speed-governor. Fig. 3 is a right side elevation of controller.
Fig. 4 is a rear elevation of the same. Fig. 5 is a left side elevation showing circuit-springs and frame. Fig. 6 is a diagrammatic representation of the circuits.

In the drawings illustrating the principles of my invention and the best mode now known to me of employing the same, 1 2 3 4 5 6 7 8 9 0 11 in Fig. 1 are numbered keys, (shown in elevation at 1 6, Fig. 3.) They are metal stampings and fit into slots of the proper width in a rocker-plate 13, each having a rocking bearing on the bottom of its respective slot, as at 75, Figs. 1, 3. A faceplate 12, Figs. 1, 3, is slotted to allow a free up-and-down movement of the keys and is secured to rocker-plate 13 by screws and nuts 14 15. A controller-frame 16 supports its several parts. A selector-frame 18 carries at its extremity a wheel 26, which engages a cam 23, fast to shaft 25. This frame 18 is hinged to piece 19 by screw-bearings 20. Said piece 19, Fig. 3, also serves to prevent the keys from leaving their slots.

A thin strip of metal 21 is provided with, say, eleven contact-points, such as 56, which are insulated from all other parts by insulation 39. Strip 22 is similar to 21, except it has one point only. The cam 23, Figs. 1, 3, 4, is engaged by wheel 26 upon the selector-frame 18, which when moved vertically by action of any one of the keys causes the shaft 25 to turn, the extreme limit of the turning being about ninety degrees, the contact-arm 27, Fig. 1, hence being brought to position shown in dotted lines at 37, Fig. 1. Secured to the shaft 25 by friction is a flat spring 24, the shaft being allowed to turn freely, while the movement of the spring is limited by screws 30 31, Fig. 1. The shaft 25 has its lower bearing in frame 16 and its upper bearing in a detachable piece 32. Carried by this shaft is a contact-arm 27, a gear 17, the contact-spring 24, the cam 23, and a pin 67, Figs. 3, 4. A spiral spring 68, secured to pin 71, always tends to move the shaft 25 back to normal position. The contact-arm 27, Figs. 3, 4, consists of two strips of springy metal, which upon coming in contact with each of the points of strips 21 22 separate and contact the top and bottom of it. A hook-switch 28 supports a telephone-receiver. It is secured to frame by screw 29 upon which it turns, its up and down movements being limited by a metal strap 33, Figs. 1, 5. Upon removal of receiver it is moved upward by spring 70, secured to frame by screw 69. It carries a piece 77, which when the receiver is replaced upon the hook engages a pin 59 in cam 23 and causes shaft 25 to turn backward slightly until arm 27 occupies position shown in dotted lines at 38, Fig. 1. Hook

28 also carries a piece 86, Figs. 4, 5, which upon moving upward engages spring 83, presses it away from spring 84, and upon being moved downward presses spring 83 into contact with spring 84 and the two springs into contact with spring 85. Likewise springs 79 80 82, Figs. 4, 5, 6, are operated by hook-switch 28, which engages insulation 81 when the hook is in extreme upper position, and springs 88 89 are operated by said hook 28 engaging insulation 87 when the hook is in extreme lower position.

A spring 62, Fig. 3, is secured to piece 19, there being one for each key for the purpose of holding it in normal position or of returning it to normal position, the extreme movements of the keys being limited by points 74 engaging the under side of frame 64. 63, Figs. 3, 4, is a lock and prevents keys from being operated when shaft 25 is out of normal position. When the shaft is in normal position, pin 67 engages pin 66 and lock 63 is moved out of engagement with points 74, said lock being contained in frame 64, hinged at 78 and held in engagement with points 74 by spring 65.

The dotted lines between 72 73 show the different lengths of extensions of the keys, the number selected depending upon the length of the extension of the key operated, as will later more fully appear. 190 is a representation of the extreme end of 19, Fig. 3, the piece 19 being rounding, and the part to which the selector-frame 18 is hinged.

A speed-governor 34 (best shown in Figs. 2, 3) is provided with a gear-wheel 41 and a ratchet-wheel 42, the two being in one piece and having free movement around shaft 43. A disk 40 is fast upon the shaft and has mounted thereon a pawl 44, which is held in engagement with ratchet 43 by spring 49. Two arms 45, having weights 46 at their extreme ends, are so moved by the centrifugal force upon rotation of disk 40 that shoes 47 are brought into contact with a friction-disk 48, fixed to frame 61, the friction retarding the rotation. The governor 34 being mounted in the frame 61, it is with its frame self-contained and secured to controller-frame 16 by screws 35 36. The frame 16 is cut away to allow the gear 17 to accomplish its full movement, is strengthened by piece 76, Fig. 4, and is slotted under screw 35, and therefore allows an easy adjustment of gear 41 in its relation to gear 17.

Springs 50 51, Figs 1, 4, 5, 6, are mounted on frame 52 and are controlled by extension 53 of gear-wheel 17, 55 being an insulated wedge on spring 51 and 54 being a support for frame 52. 58, Fig. 1, is a support for ground-screw 31. A push-button 93, Fig. 6, operates the springs 90 91 92 and is not shown in the other drawings, as it has no mechanical connection with the controller and may be placed in any convenient place on telephone. It is used to signal a called party. 60 represents the woodwork of the telephone-box.

Having explained the parts of my invention, I will now explain its mechanical action. Normally with receiver on the hook, 77 has engaged pin 59 and moved shaft into such position that contact-arm 27 is in position 38, Fig. 1, and spring 24 is in contact with screw 30. Upon removal of receiver, 77 disengages pin 53 and allows spring 68 to turn shaft and bring spring 24 into contact with ground-screw 31, which is insulated from frame, the effect being to ground the shaft, and consequently contact-arm 27, which moves across point 57, thereby contacting and grounding same during its passage. Pin 67 engages pin 66, Figs. 3, 4, and moves lock 63 out of engagement with points of keys 74. Keys are now unlocked and can be depressed to cause operation of the exchange mechanism. Suppose we depress key 11, which is used as a long-distance call. Its extension engages selecting-frame 18 at 72 and selecting-frame 18 is lifted until point 74 is stopped by the under side of top of lock-frame 64. Wheel 26 is caused to roll up the inclined face of the cam 23, which turns and moves the shaft 25 to the limit of its movement, 11 being the largest number. This brings contact-arm 27 into position 37, Fig. 1. Although in moving to this position arm 27 has made contact with point 57 and each of the points 56 of the strip 21, this has no electrical effect, because upon the start of movement the spring 24 has been caused by its friction on the shaft 25 to break from ground-screw 31 and rest against screw 30. When shaft 25 is moved from normal position, lock 63 engages remainder of keys, and thus allows only one key to be operated at a time, which key upon being returned to normal position by spring 62 forces out lock 63 and then immediately allows the lock to return, thus locking all of the keys until the shaft 25 has returned to normal position. Upon release of depressed key the frame 18 drops back to normal position, frees cam 23, and spring 68 returns shaft to normal position, carrying the arm 27 into contact successively with each of the points on strip 21, thus, as has been explained, grounding 21, which is connected direct to a line-wire, eleven times, and finally contacting 57, which at this time is connected to the other line-wire. The extension on key 1 ends at 73, so if this key should be depressed the selector-frame 18 would not be moved until 73 had reached said frame, and as the key could be depressed but slightly farther the wheel 26 would only move up the face of the cam 23 but slightly, and arm 27, Fig. 1, would move to a position between the first and second points on the strip 21. Upon its return the arm would contact one point only and finally—viz., point 57. As before explained, the difference in length of the extension of the keys between 72 73, Fig. 3, determines the distance that the selecting-frame 18 will be raised, and consequently the distance the shaft and arm 27 will be turned. When the shaft 25 leaves normal position, the gear 17 engages the gear 41, Fig. 2, the pawl 44 allowing the latter to turn without turning the governor. Upon return of shaft toward normal position, however, the pawl 44 engages ratchet 42 and causes the governor to revolve and govern speed of return, the centrifugal force throwing out arms 45 and causing the shoes 47 to engage the friction-disk 48 to a greater or less extent. In normal position extension 53 of gear 17 holds spring 50 in contact with spring 51.

Having described the mechanical operation of my invention, I will now describe its electrical functions.

Referring to Fig. 6, a party to call this station causes in a well-known way signaling-current to flow over wires 101 102, the only closed path being from wire 101, strip 21, through ringer 100, springs 89 88, to wire 102. When receiver is on hook, arm 27 is in position 38 and spring 24 is out of contact with 31. When, however, receiver is removed from the hook, arm 27 is moved toward normal position, contacting the point 22, while 24 is brought into contact with 31. This closes a circuit momentarily from wire 101 through strip 21, springs 82 80, point 22, arm 27, spring 24, point 31, to ground 94, which causes central-office mechanism to move into position to receive selective impulses. At the beginning of the upward movement of hook after receiver is removed the springs 88 89 are allowed to break contact, and at the finish of the movement spring 80 breaks contact with spring 82 and contacts spring 79. The calling party now presses down a key, which causes arm 27 to move back over point 22 and points of strip 21, the distance depending on which key is operated. This backward movement causes spring 24 to break contact with spring 31. As the key is released and arm 27 starts toward normal position again the arm contacts as many points of 21 as it has moved over during its backward movement and establishes a circuit from line 101, through strip 21, arm 27, spring 24, point 31, to ground 94 as many times as there are points with which to contact, a final contact being made from line 102, through springs 79 80, point 22, arm 27, spring 24, point 31, to ground 94. As arm 27 starts from normal position it allows springs 50 51 to break contact. At the completion of a call, button 93 is operated and causes spring 91 to break contact with spring 92 and make contact with spring 90, thus completing a signaling-circuit from wire 101, through strip 21, spring 91, spring 90, to ground 94. Common transmitter-battery is now applied to lines 101 102 from central station through the following circuit: from 101, through strip 21, springs 91 92, primary winding of induction-coil 96, transmitter 97, springs 50 51, to line 102. Conversation can now be carried on, 98 representing the secondary winding of the induction-coil, and 99 the receiver. Replacing receiver causes springs 83 84 85 to be pressed momentarily together, thus connecting lines 101 102 to ground at 95, which causes by suitable mechanism restoration of central-office apparatus. Spring 80 is allowed to come back into contact with spring 82, spring 88 is brought into contact with spring 89, arm 27 is moved to position 38, and spring 24 breaks from ground-screw 31.

In fine, by means of my invention I have provided a controller compact in form and convenient to operate, having keys that have a uniform movement, having parts accessible, easily detached and assembled, and having on its keys numbers the size of which is such that they can be easily seen, and thus reducing the liability to mistake in operating the keys, and, further, the shape of the controller is such that the mechanism may be conveniently placed under the shelf of a telephone in the position commonly occupied by the ringer in common-battery telephones, thus economizing space.

What I claim is—

1. A shaft; a cam mounted thereon; a contact-arm; a series of contacts with which the contact-arm may be moved successively into engagement; a series of manually-operated parts operatively connected with said cam, whereby said contact-arm may be moved into engagement with one or more of said series of contacts.

2. A shaft; a contact-arm fixed thereon; a cam fixed to said shaft; a pivoted member engaging said cam; a series of parts, any one of which may be moved into engagement with, and move said pivoted member, all being so designed that each part moves said member a different amount and causes a corresponding difference in the movement of the cam, shaft, and contact-arm.

3. A shaft; a contact-arm fixed thereto; a cam mounted thereon; a pivoted member engaging the cam; a series of levers to engage and move said pivoted member.

4. A shaft; a contact-arm fixed thereto; a cam fixed to said shaft; a pivoted member engaging the cam; a series of levers, all of which are capable of equal movements, and each of said levers having an extension thereon differing in length from that of any other, and engaging said pivoted member, whereby the pivoted member, cam, and shaft may give to the contact-arm movements of corresponding lengths.

5. A shaft; a contact-arm fixed thereto; a series of levers having uniform movements, and provided with extensions of different lengths; means operatively connected with said shaft, and designed to be engaged by the extensions on said levers, whereby a full movement of any lever will cause the shaft, and hence the contact-arm, to move a distance peculiar to the lever moved, but different from that peculiar to any other lever.

6. A shaft; a gear fixed thereto, in combination with a governor, which comprises a gear, meshing with said gear fixed to the shaft; a ratchet-wheel integral with said gear, and loose on the shaft; a disk fast to said shaft; a pawl pivoted to said disk; arms pivoted to said disk, and provided with shoes to engage a friction-disk fast to the governor-frame; all being designed to regulate the speed with which the shaft moves in one direction, and to provide a regulator which is self-contained.

7. A series of levers; a shaft; a lock-bar in locking engagement with said levers; a hook-lever; means whereby a movement of said lever causes the lock to become disengaged from said levers, and leaves each one free to be operated; means whereby a movement of the shaft out of its normal position, caused by a movement of any one of the levers, causes the lock again to lock all of the other levers; and permits the used lever, on its return to normal position, to become locked also.

8. In a controller, a shaft provided with a metal contact-arm; a metal piece loosely mounted upon the shaft, but in frictional engagement with the shaft; two points, between which the free end portion of the metal piece is free to move, one of said points being electrically connected with ground.

9. In a controller, a frame, having a governor mounted therein; a shaft and a gear fixed thereto; said frame being pivoted, and provided with means whereby the mechanism of said governor may be adjusted and secured in engagement with said gear on the shaft.

In testimony whereof I affix my signature in presence of two witnesses.

ALTON E. STEVENS.

Witnesses:
MARY R. HOLT,
JAMES H. KENYON, Jr.